United States Patent [19]
Romero et al.

[11] 4,433,846
[45] Feb. 28, 1984

[54] READILY REMOVABLE SHAFT SEAL INCLUDING VENTING TAB

[75] Inventors: Richard A. Romero; Michael J. Schmidt, both of Schaumburg, Ill.

[73] Assignee: Chicago Rawhide Manufacturing Company, Elgin, Ill.

[21] Appl. No.: 486,983

[22] Filed: Apr. 20, 1983

[51] Int. Cl.³ .................. F16J 15/16; F16J 15/32
[52] U.S. Cl. ................................ 277/9; 277/29; 277/35; 277/153
[58] Field of Search ............... 277/9, 9.5, 10, 29, 277/35, 47–50, 152, 153, 1

[56] References Cited

U.S. PATENT DOCUMENTS

| | | | |
|---|---|---|---|
| 3,116,066 | 12/1963 | Koppins | 277/9 X |
| 3,273,899 | 9/1966 | Warnery | 277/9 X |
| 4,300,777 | 11/1981 | Symons | 277/153 |

FOREIGN PATENT DOCUMENTS

| | | | |
|---|---|---|---|
| 732882 | 4/1966 | Canada | 277/9 |
| 940953 | 3/1956 | Fed. Rep. of Germany | 277/153 |
| 843382 | 8/1960 | United Kingdom | 277/9 |

*Primary Examiner*—Robert S. Ward
*Attorney, Agent, or Firm*—James T. FitzGibbon

[57] ABSTRACT

A fluid seal with sealing lips having a casing with a generally annular mounting flange portion, a second flange portion with portions thereof extending radially from the mounting portion and being subdivided into an intermediate portion and a bonding portion. At least one venting tab is formed by piercing the intermediate casing portion. The venting tab area provides a vent permitting passage of gas and vapor into and out of the sealed region. The tab area also is capable of removal or bending when engaged with a removal tool.

12 Claims, 10 Drawing Figures

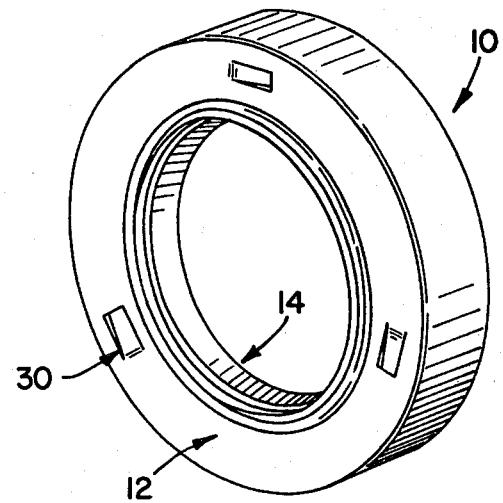
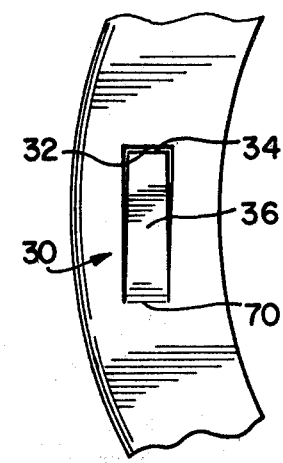
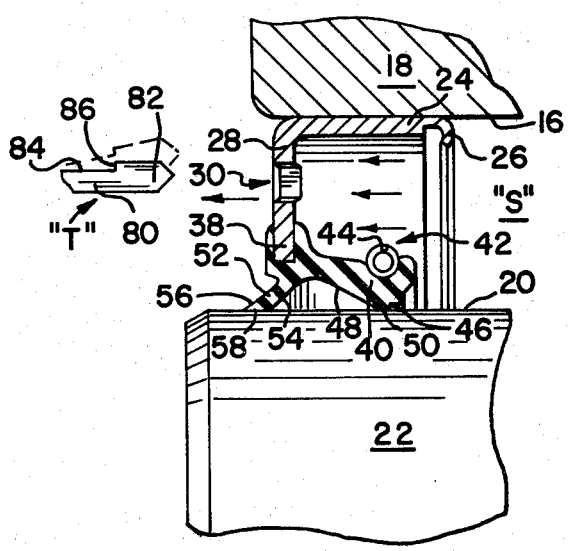
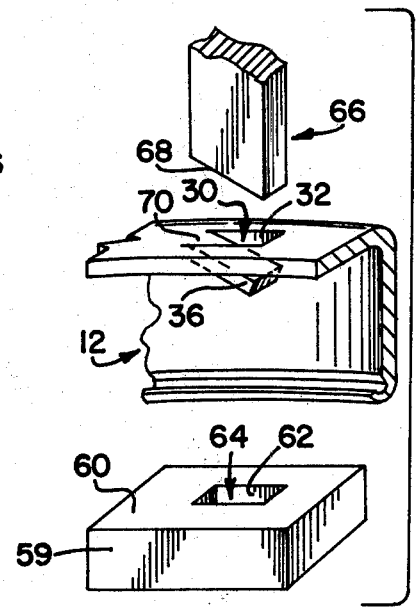

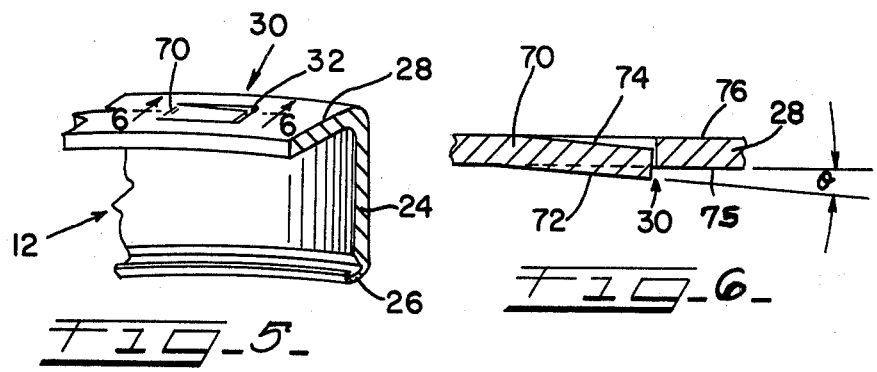
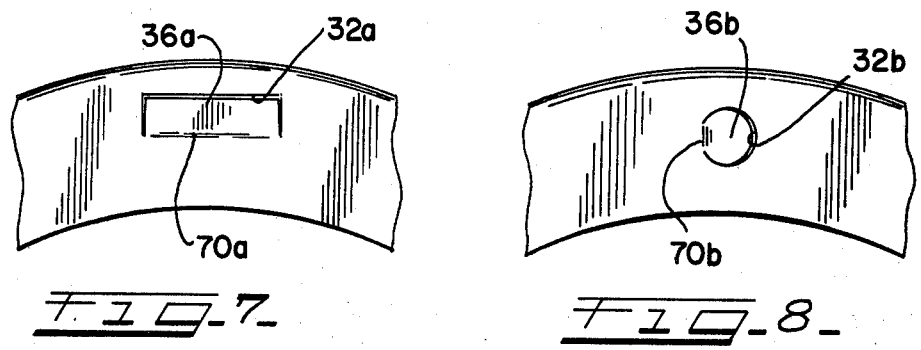
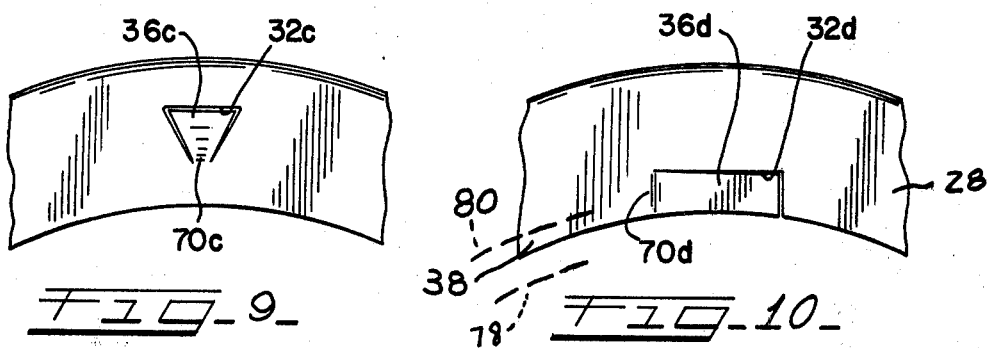

READILY REMOVABLE SHAFT SEAL INCLUDING VENTING TAB

The present invention relates generally to fluid seals and more particularly to seals adapted to retain grease, oil or other lubricating medium within desired areas of a machine assembly having parts which undergo rotation relative to each other.

While oil seals of the general type with which the invention is concerned have been known and used for a number of years, there is a continuing need for improved seals which have one or more specialty requirements either not heretofore known, or which have not been required, for one reason or another, in earlier applications.

More specifically, one problem has recently arisen with the advent of the new, so-called "unit pack" parts is that of venting seal cavity pressure to the atmosphere. By way of particular example, along with the increasing popularity of front wheel drive automobiles, a requirement has arisen that the size and mass of driveline components such as wheel hubs, final drive components, and the like be reduced. This, in turn, has led to the design and manufacture of parts which may be considered "hard working", that is, that which operate under relatively high stresses. These machine designs call for closely spaced apart bearing sets and the like, disposed within a seal cavity often filled with grease to a much greater extent than is common in the prior art; sometimes the cavities are 40% to 85% full of the entire volume of this region.

Because of the small size, heavy loads and generally compact design of such units, it is not uncommon for them to undergo rapid temperature rise in use. Where the sealed medium is grease, and where the assembly is exposed to a wide variety of ambient conditions, rapid temperature rise leads to outgassing, and vaporization of water, or vapor present either in the grease or in the head space above it. In some instances, this pressure acts to increase the radial load of the elastomeric seal lip body, wearing it unduly and creating an even tighter than intended seal in this area. As a consequence, of fitting tightly on both its inside and outside diameters, pressure buildup has often literally blown seals out of the counterbores or cavities in which they were received, creating the potential for catrostropheric failure of the entire sealed assembly.

At the same time, while there has been a need to provide a seal which would vent itself under these conditions and under the reverse conditions, namely, return of the sealed mechanism to lower pressures and temperatures, there is still a requirement for a relatively tight mechanical fit around the outside diameter of the seal, or in the case of "reversed" seals, on the inside or other diameter on which the secondary seal is formed.

In this connection, the expression "primary seal" relates to a seal between relatively movable parts, such as the elastomeric seal band area on the lip of a radially acting seal and the shaft with which it is associated in use; a "secondary" seal is the seal between two different but relatively non-rotatable parts, such as between the seal and the housing.

Naturally, while various approaches to this problem have been or may be considered, it is highly preferable that any such design be simple to manufacture, and provide low cost along with reliability that is, the ability to be made and installed consistently without the use of unusually precise equipment or highly skilled labor.

A second consideration which has recently assumed relatively great importance in seal design is the need for ease of removal. A concommitant consideration of reducing the overall size of sealed mechanisms is the desire to reduce the overall size of the seal itself.

With the need and desire for size reduction comes a desire for cost reduction. Where the sealed mechanism is very compact, it is usually correspondingly difficult to gain access to the installed seal for purposes of eventual removal and replacement.

Whereas some designs include flanges or the like to locate the depth to which the seal may be inserted, and which flanges may simplify seal removal, they use significant amounts of extra material, and are still not always easily removed, particularly in smaller sizes, without the aid of unusual tools.

According to the present invention, it is possible to provide a seal which will be as economical as prior art seals, but which, if desired, will provide a venting mechanism and which will, at the same time, provide means for ready removal for repair and replacement, either at the point of manufacture and assembly, or for subsequent repair or replacement in the field.

In view of the failure of the prior art to provide a low cost, readily removable seal unit having a pressure venting potential, it is an object of the present invention to provide an improved, easily removable pressure venting oil seal.

Another object of the invention is to provide an oil seal capable of easy removal and able to provide positive venting, but which may be made by the same manufacturing methods without incorporating a positive venting feature.

Another object of the invention is to provide a seal assembly which includes one or more areas of weakness defing push out areas in an end face of the seal casing, defined by lines of weakness and adapted to be opened or further opened by insertion by a simple tool used to remove the seal.

Another object of the invention is to provide an improved method of making an easily removable oil seal, with or without a positive venting feature.

A further object of the invention is to provide an oil seal which will leak little, if any, of the sealed material, preferably grease, but which will provide positive venting of air and other gases present in the lubricant.

BRIEF DESCRIPTION OF THE DRAWINGS

FIG. 1 is a perspective view of an oil seal embodying the invention;

FIG. 2 is a fragmentary enlarged front view showing one form of vent embodying the invention;

FIG. 3 is a fragmentary vertical sectional view, showing an oil seal according to the invention received within a machine counterbore and placed in operative relationship in an associated shaft, and illustrating the venting action achieved by the seal, and a removal tool;

FIG. 4 is an exploded fragmentary perspective view, illustrating somewhat diagrammatically one form of apparatus used in the manufacture of seal casings made according to the invention;

FIG. 5 is a perspective view, particularly in section and with a portion broken away showing the casing of FIG. 4 after a subsequent operation;

FIG. 6 is a vertical sectional view of the seal casing of FIG. 5;

FIG. 7 is a fragmentary view showing a modified form of vent; and

FIG. 8 is a fragmentary view showing a further modified form of vent used on a seal embodying the invention;

FIG. 9 is a fragmentary view showing a further modified form of vent used on a seal embodying the invention;

FIG. 10 is another modified form of vent used on a seal embodying the invention.

DESCRIPTION OF THE PREFERRED EMBODIMENTS OF THE INVENTION

Whereas seals made according to the invention may be embodied in different forms and may have a number of applications, a description of several preferred embodiments of the seal will be given wherein the sealed machine part is a shaft, wherein the machine member comprises a housing having a seal-receiving counterbore therein, and wherein the sealed medium is grease.

Referring now to the drawings in greater detail, FIG. 1 shows a seal generally designated 10 to embody the principles of the invention and to comprise two principal elements, namely, a steel or similar rigid casing element 12, having bonded thereto an elastomeric seal body 14. Referring particularly to FIG. 3, it is shown that the seal 10 is received within a counterbore 16 formed in a housing or like machine part 18. In use, the seal is intended to engage another machine part, in this case, the exterior surface 20 of a rotary shaft 22, in fluid-tight relation in a known manner.

Referring again to the seal unit 10, the casing 12 is shown to include an axially extending mounting flange 24, having a curled end portion 26; it is also shown that a radial flange 28 joins the axial flange 24 and extends radially inwardly thereof. According to the invention, venting means generally designated 30 is formed in the radial flange 28, with such means being defined by a plurality of sidewall walls 32 formed in the flange 28 with one or more openings 34 (FIG. 2) being defined between these inwardly directed walls 32 and counterpart surfaces on the tab 36 defined in part by the walls 32.

Referring again to FIG. 3, it is shown that a radially innermost portion of the radial flange 28 of the casing 12 includes a bonding portion 38 to which an elastomeric primary seal lip body 40 is bonded in a manner known to those skilled in the oil seal art. The primary lip body includes a spring groove 42, receiving an annular garter spring 44. The seal body 40 itself is also defined in part by a so-called "oil side" surface 46, which is a frusto-conical surface directed toward the shaft and toward the sealed region. An "air side" surface 48 is also a frusto-conical surface directed toward the shaft and partially away from the sealed region. The surfaces 46, 48 meet at their inner peripheries to form a circular or like seal band 50. In the illustrated embodiment, the seal band 50 is circular, but it is understood to be within the scope of the invention to have the seal band axially sinuous, as illustrated for example in U.S. Pat. Nos. 3,927,600 and 3,929,340.

Another portion of the lip body 40 is an excluder or dirt lip body 52 which, as is known to those skilled in the art, is adapted to exclude exterior contaminants, usually dust or the like, from the seal band area. This body 52 is defined by an axially inner frusto-conical surface 54 and an outer surface 56, which are connected to each other by an annular contact surface 58 which runs in light contact with, or spaced just apart by a very slight working clearance from the associated rotary shaft 22.

In the use of the seal, as shown by the small arrows, in FIG. 3, pressure building up within the sealed region generally designated "S" may be vented, with gas, vapor or the like passing through one or more of the small openings or vent passages 34.

Referring now to the manufacture of the seal of the invention, an in particular to FIGS. 4–6, it will be appreciated that the method is straightforward. Assuming that a casing 12 has been made in the conventional manner, as by stamping, and it is desired to place a suitable opening therein. The casing 12 is positioned with the inner surface 75 of the wall 28 overlying a support block or fixed die 59 having an upwardly directed surface 60 in which plural sidewalls 62 are formed to define an opening 64.

Thereafter, a tool 66 having sharpened cutting edges 68 is pressed downwardly into and at least partially through the flange 28, forming a tab 36 by cutting the sidewalls 32 shown in FIGS. 2, 4 and 5, for example. This pushes the tab 36 downwardly about a line 70, forming a hinge; the resulting tab 36 has interior and exterior surfaces formed from the interior and exterior formed from the interior and exterior 72, 74 which are parallel to each other, but which are inclined with respect to their associated inner surface portion 75 (FIG. 6) by an angle shown therein as $\theta$. As is also shown in FIG. 4, the tab 36 is hinged downwardly during forming at a considerable angle, making a large opening 34. Subsequently, the tab 36 thus formed is raised back into a planar or nearly planar relationship with the inner surface 75 of the flange 28, providing a desirably small vent 30. It will be appreciated that the degree of venting action may be varied by the degree to which the tab 36 is bent back into the plane of the wall or flange 28 of the stamping 12.

Referring now to FIG. 3, and to the readily removable feature of the invetion, a removal tool generally designated T is shown in solid and phantom lines, indicating its operation. The tool T is shown to include a shank portion 80, a nose portion 82, a reduced thickness or notch portion 84, and an engagement shoulder 86 formed where the surface 84 joins the enlarged nose portion 82. As will be understood, when it is desired to remove the venting seal of the invention, one or more rigid tools such as the tool T may be inserted into the opening 30 by pressing the tab 36 inwardly, allowing the tool thereafter to spring or be pushed radially outwardly as shown in the phantom lines in FIG. 3. Thereupon, the shoulder 86 of the tool T engages an inner surface portion 75 of the stamping radial wall 28. Assuming that such tool is a standard two, three or four armed tool, removing the seal axially is a very simple task. Thus, the tabs 36 provide a means of venting the seal and providing an aperture or potential for insertion of a removal tool.

Referring now to FIG. 2, it is shown that, when viewed from the air side of the seal in elevation, the tabs may be of generally rectangular configuration with a single, generally radial hinge portion 70. FIG. 7 shows a tab 36a, also of rectangular configuration, but having its hinge line 70a running generally circumferentially. In FIG. 7, the walls 32a are shown as partially defining the vent opening.

FIG. 8 shows an alternate form of the invention wherein the tab 36b is of almost circular configuration with the hinge 70b in the illustrated case extending generally radially. The vent opening 32b is shown as a slit or the like resulting from a slight inwardly directed bend on the tab 36b about the hinge line 70b.

FIG. 9 shows a similar embodiment except that the tab 36c is triangular, having somewhat enlarged sidewalls 32c. The tab 36c folds about a small hinge line 70c. Finally, FIG. 10 illustrates a construction wherein the tab 36d folds about a radial hinge line 70d but wherein one of the walls 32d actually extends into the inner circumference of the oil seal. The construction of FIG. 10, the stamping is easy to manufacture and may be pressed to form the seal body, a heel portion of which may be attached to a part of the tab with remaining portions of the wall 32d providing the venting action.

As shown by the broken lines 78, 80 in FIG. 10, it is possible to use portions of the seal mold to flatten the tab 36d back into the plane of the radial wall 28 of the casing 12 at the same time the margin 80 of the bonding portion 38 is formed. In other words, when the stamping 12 is placed in the mold and cut as shown in FIG. 10, the mold closes and the outer margin 80 of the elastomeric seal body is formed by a band engaging opposed surfaces of the casing 12. This closing off or pinching out which defines the outermost extent to which the rubber extends along the heel or bonding portion 38 of the radial wall 28 also serves to bring the tab 36d into a flat plane.

From the foregoing examples, it will be noted that the exact size, shape, and location of the vents is not particularly critical to the success of the invention.

A desirable feature of the invention is the spacing apart of the vents in such a way that if one or more of the vents are covered with grease or the like, it is only necessary that another vent be relatively open, whereupon the gas, vapor or the like will escape through the unobstructed vent without causing undue leakage of viscous material through the other vents.

Referring now to the ready removal feature of the seal, it is not uncommon, especially in compact seals, to manufacture them with a so-called "shotgun" casing, that is, a casing having a construction such as the brass end of a shotgun shell wherein a radially outwardly and then inwardly extending flange is formed to provide, in the case of the shotgun, a shoulder to insure the shell will not enter the barrel beyond the desired position, and in the case of a seal, to insure that it is mounted to the depth desired. These "shotgun" casing seals are convenient to remove because the flanges in question serve as a pry flange against which a screwdriver or other tool may be used for seal removal. However, these casings must be folded upon themselves, they require the use of extra material, and create a risk of subsequent damage by cracking of the metal which is formed during bending.

According to the present invention, a readily removable seal is provided which has all of the advantages of having the venting mechanism formed as an adjunct to manufacture of the seal but without otherwise changing the characteristics of the seal.

In the case of seal called upon to seal grease or oil which may tend to leak from one or more of the vent openings, for one reason or another, it is possible, after the seal has been installed to use gasket sealer or like material to cover up one or more vents in the lower portion of the mechanism, leaving one or two upper vents unobstructed. On the other hand, the seal may be constructed with a single vent, but this does not achieve the advantages of ready removal achieved by a seal having three or four vents therein.

With a single vent construction, it would normally be necessary to orient this seal in use before placing it over the shaft to insure that the vent remains in the desired location; this is unnecessary where several vents are provided.

In the illustrated embodiments, the vents are placed in the radial wall of the stamping or casing; it will be appreciated, however, that these vents could also be placed in some place intermediate the mounting and bonding portions of the stamping, which part might for one reason or another be a radial flange, a bend or turn, or the like. The invention, however, is most practical in the form shown, with the illustrated embodiments showing a primary seal being made against a rotatable shaft passing through the inside diameter of the seal, and with the mounting diameter being the outside diameter of the seal. It will occur to those skilled in the art that the principles of the invention are also applicable to seals having more complex stamping shapes, as well as those seals wherein the secondary seal or mounting portion is formed on the inside of the seal, with the primary seal being a radially outwardly acting lip.

It will thus be seen that the present invention provides a novel fluid seal having a number of advantages and characteristics including those pointed out above and others which are inherent in the invention. A preferred embodiment of the invention having been described by way of illustration, it is anticipated that changes and modifications of the described fluid seal will occur to those skilled in the art and that such changes and modifications may be made without departing from the spirit of the invention or the scope of the appended claims.

We claim:

1. A fluid seal for retaining lubricant within a sealed region during relative movement of two machine members, said seal comprising, in combination, a relatively rigid casing portion adapted to be received in fluid tight relation with respect to the first of said two machine members, said casing including a mounting surface portion adapted for snug reception with respect to said first member, another, spaced apart bonding portion adapted to have a portion of an associated sealing lip body bonded thereto, and an intermediate casing portion extending between said mounting portion and said bonding portion, and an elastomeric primary sealing lip body having a frusto-conical surface generally directed towards said sealed region and a frusto-conical surface directed generally away from said sealed region, with said frusto-conical surfaces meeting along a generally circular or sinuous locus defining a seal band for intended engagement with part of the second of said machine members, said sealing lip body also having a bonding portion bonded to said bonding portion of said casing, with at least said intermediate portion of said casing having a cut through portion and at least part of a hinge portion combining to define at least a portion of the periphery of a predetermined tab area to provide a vent permitting passage of gas and vapor into and out of said sealed region, said tab area also being an area capable of removal or bending when engaged with a tool adapted to be used in removing said seal from said first machine member.

2. A fluid seal as defined in claim 1 wherein said sealing lip body further includes a secondary excluder lip body, said excluder lip body including an annular surface adapted for engagement with said second machine member, said sealing lip further including a frustoconical surface directed toward said sealed region and toward said second machine member.

3. A fluid seal as defined in claim 1 wherein said mounting surface portion comprises an axial flange of said casing, said axial flange forming the outer diameter of said casing.

4. A fluid seal as defined in claim 1 wherein said at least one predetermined tab area comprises a plurality of areas spaced angularly apart from one another on said intermediate casing portion.

5. A fluid seal as defined in claim 1 wherein said intermediate casing portion comprises an annular, radially extending flange lying in a single plane, and wherein said bonding portion of said casing comprises a planar continuation of said radial flange.

6. A fluid seal as defined in claim 1 wherein said at least one predetermined tab area comprises a rectangular area lying within said intermediate casing portion, and having said cut through portions defining three of its sides and said hinge portion defining its fourth side.

7. A fluid seal as defined in claim 1 wherein said predetermined tab area comprises the major portion of a circular area having said cut through portion lying within said intermediate casing portion and with said hinge comprising the remainder of said tab area.

8. A fluid seal as defined in claim 1 wherein said cut through portion comprises a generally L-shaped cut, with one leg of said cut being a radial portion lying at least partially in said bonding portion of said casing, with another leg of said cut lying within said intermediate casing portion, and said hinge lying partially in each of said intermediate and bonding portions.

9. A method of manufacturing an oil seal, said method comprising forming a seal casing having a relatively rigid casing portion, including a mounting surface portion adapted for snug reception with respect to a first machine member, a bonding portion spaced apart from said mounting portion, and an intermediate casing portion extending between said mounting portion and said bonding portion, piercing at least a portion of said intermediate casing to form at least one sidewall defining a cut through venting tab attached to a part of said casing along a hinge line, and bonding an elastomeric seal body to said bonding portion of said casing to form a composite seal, leaving at least a portion of said sidewall spaced from said seal body to permit passage of gas or vapors therethrough.

10. A method of forming a fluid seal, said method comprising forming a casing having a generally annular mounting flange portion, a second flange portion with at least portions thereof extending radially from said mounting portion and being subdivided into an intermediate portion and a bonding portion, forming at least one venting tab in said intermediate casing portion by piercing said casing to provide a venting tab spaced from the remainder of said casing by said cut lines and joined thereto by a hinge line portion, and simultaneously forming a elastomeric seal lip and bonding said seal lip to said bonding portion of said casing to provide a fluid seal having a vent passage therein, said tab being capable of removal or bending when engaged with a tool for use in removing said seal from an associated machine member.

11. A method as defined in claim 10 wherein forming said tab includes the step of bending said tab substantially out of the plane of said casing portion about the axis of said hinge line, and subsequently bending said tab back towards said plane of said casing portion to reduce the effective area of said vent passage.

12. A fluid seal for retaining lubricant within a sealed region during relative movement of two machine members, said seal comprising, in combination, a relatively rigid casing portion adapted to be received in fluid tight relation with respect to the first of said two machine members, said casing including an axially extending mounting flange with an exterior surface portion adapted for snug reception with respect to said first member, another, spaced apart bonding portion adapted to have a portion of an associated sealing lip body bonded thereto, and an intermediate casing flange extending radially between said mounting flange and said bonding portion, and an elastomeric primary sealing lip body having a frusto-conical surface generally directed towards said sealed region and a frusto-conical surface directed generally away from said sealed region, with said frusto-concial surfaces meeting along a generally circular or sinuous locus defining a seal band for intended engagement with part of the second of said machine members, said sealing lip body also having a bonding portion bonded to said bonding portion of said casing, with said intermediate flange having a plurality of angularly spaced apart venting tabs formed therein, each of said tabs having a periphery defined by a cut through portion and a hinge portion, said tabs permitting passage of gas and vapor into and out of said sealed region, and also being capable of removal or bending when engaged with a tool adapted to be used in removing said seal from said first machine member.

* * * * *